US012629963B2

(12) United States Patent
Visca

(10) Patent No.: US 12,629,963 B2
(45) Date of Patent: May 19, 2026

(54) WHEEL HUB AND BRAKE ROTOR ASSEMBLY

(71) Applicant: ArvinMeritor Technology, LLC, Troy, MI (US)

(72) Inventor: Michael A. Visca, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 427 days.

(21) Appl. No.: 18/521,342

(22) Filed: Nov. 28, 2023

(65) Prior Publication Data

US 2025/0170854 A1     May 29, 2025

(51) Int. Cl.
*F16D 65/12*     (2006.01)
*B60B 27/00*     (2006.01)
*B60B 27/02*     (2006.01)

(52) U.S. Cl.
CPC .......... B60B 27/0052 (2013.01); B60B 27/02 (2013.01)

(58) Field of Classification Search
CPC ................ B60B 27/0052; B60B 27/02; F16D 2065/1384; F16D 2065/1392; F16D 65/123
See application file for complete search history.

(56) References Cited

U.S. PATENT DOCUMENTS

| | | | |
|---|---|---|---|
| 4,161,120 A | 7/1979 | Cloarec | |
| 4,946,296 A | 8/1990 | Olschewski | |
| 5,031,967 A | 7/1991 | Svensson | |
| 5,476,272 A | 12/1995 | Hixson | |
| 5,695,289 A | 12/1997 | Ouchi | |
| 6,186,667 B1 | 2/2001 | Nakamura | |
| 6,217,220 B1 | 4/2001 | Ohkuma | |
| 6,446,765 B1 * | 9/2002 | Dabertrand | F16D 65/12 188/71.6 |
| 6,457,869 B1 | 10/2002 | Smith | |
| 7,455,459 B2 | 11/2008 | Toth | |
| 7,779,969 B2 | 8/2010 | Gonska | |
| 8,020,676 B2 | 9/2011 | Bradley | |
| 8,418,817 B2 * | 4/2013 | Visca | F16D 65/12 188/218 XL |
| 8,950,556 B2 * | 2/2015 | Root | F16D 65/123 188/218 XL |
| 9,261,144 B2 | 2/2016 | Duch | |
| 9,506,515 B2 | 11/2016 | White et al. | |
| 9,897,154 B2 * | 2/2018 | Root | B60B 27/0052 |
| 10,495,162 B2 * | 12/2019 | Burris | B60B 27/0052 |

(Continued)

FOREIGN PATENT DOCUMENTS

| | | |
|---|---|---|
| DE | 102014106519 A1 | 11/2015 |
| EP | 0822413 A2 | 7/1997 |

(Continued)

OTHER PUBLICATIONS

Poquadeck et al., U.S. Appl. No. 18/299,376, filed Apr. 12, 2023; 37 pages.

*Primary Examiner* — Thomas W Irvin
(74) *Attorney, Agent, or Firm* — Dickinson Wright PLLC

(57)     ABSTRACT

An assembly comprising a wheel hub and a brake rotor. The wheel hub comprises first and second mounting bosses that are spaced apart from each other. The brake rotor comprises a mounting flange. The mounting flange comprises first and second mounting flange flanks. The first and second mounting flange flanks are tapered.

20 Claims, 8 Drawing Sheets

(56)     References Cited

U.S. PATENT DOCUMENTS

| | | | |
|---|---|---|---|
| 10,495,163 | B2 | 12/2019 | White et al. |
| 10,527,115 | B2 * | 1/2020 | Edwards ................. F16D 65/12 |
| 10,704,602 | B2 | 7/2020 | Gonska |
| 10,830,295 | B2 * | 11/2020 | Sabeti ................... F16D 65/123 |
| 10,837,509 | B2 * | 11/2020 | Sabeti ................... F16D 65/123 |
| 11,226,020 | B2 | 1/2022 | Gonska et al. |
| 11,629,765 | B2 | 4/2023 | Jenkinson et al. |
| D1,019,492 | S * | 3/2024 | Jackson ........................ D12/180 |
| 11,920,647 | B2 * | 3/2024 | Harrington ........... F16D 65/123 |
| 2007/0211974 | A1 | 9/2007 | Toth et al. |
| 2012/0247881 | A1 * | 10/2012 | Root ................... B60B 27/0052 |
| | | | 188/18 A |
| 2012/0247883 | A1 * | 10/2012 | Root .................... F16D 65/123 |
| | | | 188/18 A |
| 2013/0001029 | A1 * | 1/2013 | Visca ..................... F16D 65/12 |
| | | | 188/234 |
| 2014/0239597 | A1 | 8/2014 | White et al. |
| 2015/0107742 | A1 | 4/2015 | Knapke et al. |
| 2016/0059626 | A1 | 3/2016 | Gemello et al. |
| 2016/0318359 | A1 | 11/2016 | Knapke et al. |
| 2017/0074335 | A1 * | 3/2017 | Wagner ................. F16D 65/123 |
| 2019/0078632 | A1 * | 3/2019 | Burris ................... F16D 65/123 |
| 2020/0096064 | A1 * | 3/2020 | Stevenson ............. F16D 65/123 |
| 2021/0317886 | A1 * | 10/2021 | Harrington ........... F16D 65/123 |
| 2023/0383804 | A1 * | 11/2023 | Poquadeck ............. B60T 17/22 |

FOREIGN PATENT DOCUMENTS

| | | | |
|---|---|---|---|
| EP | 2980432 | A1 | 3/2014 |
| JP | 2004169925 | | 6/2004 |

* cited by examiner

WHEEL HUB AND BRAKE ROTOR ASSEMBLY

TECHNICAL FIELD

The invention relates to an assembly that comprises a wheel hub and a brake rotor.

BACKGROUND

A brake rotor is disclosed in U.S. Pat. No. 11,629,765.

SUMMARY

The invention relates to an assembly. The assembly comprises a wheel hub and a brake rotor. The wheel hub is rotatable about an axis. The wheel hub comprises a first mounting boss and a second mounting boss. The first mounting boss is spaced apart from the second mounting boss. The brake rotor is disposed on the wheel hub. The brake rotor comprises a mounting flange. The mounting flange comprises a first mounting flange side, a second mounting flange side, a first mounting flange flank, a second mounting flange flank, and an inner mounting flange side. The second mounting flange side is disposed opposite the first mounting flange side. The first mounting flange flank extends between the first mounting flange side and the second mounting flange side. The first mounting flange flank engages the first mounting boss. The second mounting flange flank extends between the first mounting flange side and the second mounting flange side. The second mounting flange flank engages the second mounting boss. The inner mounting flange side faces toward the axis. The inner mounting flange side extends between the first mounting flange flank and the second mounting flange flank. The first mounting flange flank and the second mounting flange flank are axially tapered such that the first mounting flange flank and the second mounting flange flank extend farther apart in a direction that extends from the first mounting flange side to the second mounting flange side. The first mounting flange flank and the second mounting flange flank are radially tapered such that the first mounting flange flank and the second mounting flange flank extend farther apart in a direction that extends from the inner mounting flange side away from the axis.

The wheel hub may further comprise a connecting surface. The connecting surface may extend from the first mounting boss to the second mounting boss. The connecting surface may extend away from the axis. The first mounting flange side of the mounting flange of the brake rotor may face toward the connecting surface. The first mounting flange side may be spaced apart from and may not contact the connecting surface.

The assembly further comprises a fastener. The fastener may be secured to the wheel hub. The fastener may engage the second mounting flange side of the mounting flange of the brake rotor to inhibit axial movement of the brake rotor away from the connecting surface. The fastener may be spaced apart from the first mounting boss. The fastener may be spaced apart from the second mounting boss. The fastener may include a plurality of openings. The plurality of openings may be arranged around the axis. The fastener may be received in a groove in the wheel hub. The fastener may include an anti-rotation feature. The anti-rotation feature may extend toward the axis. The anti-rotation feature may extend into a recess that extends from a bottom wall of the groove toward the axis.

The first flange mounting flank may be substantially planar. The second flange mounting flank may be substantially planar.

A mounting boss may further comprise an outboard side. The outboard side may face toward the brake rotor and the fastener. A mounting boss may further comprise a first flank. The first flank may extend from a first end of the outboard side toward the connecting surface. A mounting boss may further comprise a second flank. The second flank may be disposed opposite the first flank. The second flank may extend from a second end of the outboard side toward the connecting surface. The first flank and the second flank may be axially tapered such that the first flank in the second flank extend farther apart as the first flank and the second flank extend away from the outboard side.

The first flank of the first mounting boss and the second flank of the second mounting boss may face toward each other. The first flank of the first mounting boss and the second flank of the second mounting boss may extend farther apart from each other as the first flank and the second flank extend away from the axis. The first flank, the second flank, or both may be substantially planar.

A mounting boss may further comprise a first flank connecting surface. The first flank connecting surface may extend from an end of the first flank that is disposed opposite the outboard side toward the connecting surface. The first flank connecting surface may be disposed substantially perpendicular to the outboard side of the first mounting boss.

The second mounting boss may further comprise a second flank connecting surface. The second flank connecting surface may extend from an end of the second flank that is disposed opposite the outboard side toward the connecting surface. The second flank connecting surface of the second mounting boss may face toward the first flank connecting surface of the first mounting boss. The brake rotor may be spaced apart from the first flank connecting surface. The brake rotor may be spaced apart from the second flank connecting surface.

The brake rotor and the wheel hub may cooperate to define a gap. The gap may extend from the connecting surface of the wheel hub to the first mounting flange side of the mounting flange of the brake rotor. The gap may extend from the first flank connecting surface of the first mounting boss to the second flank connecting surface of the second mounting boss.

The second mounting flange side of the mounting flange of the brake rotor may be axially offset from the outboard side of the first mounting boss. The second mounting flange side may be disposed farther from the connecting surface than the outboard side of the first mounting boss is disposed from the connecting surface. The fastener may engage the second mounting flange side. The fastener may be spaced apart from the outboard side of the first mounting boss.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
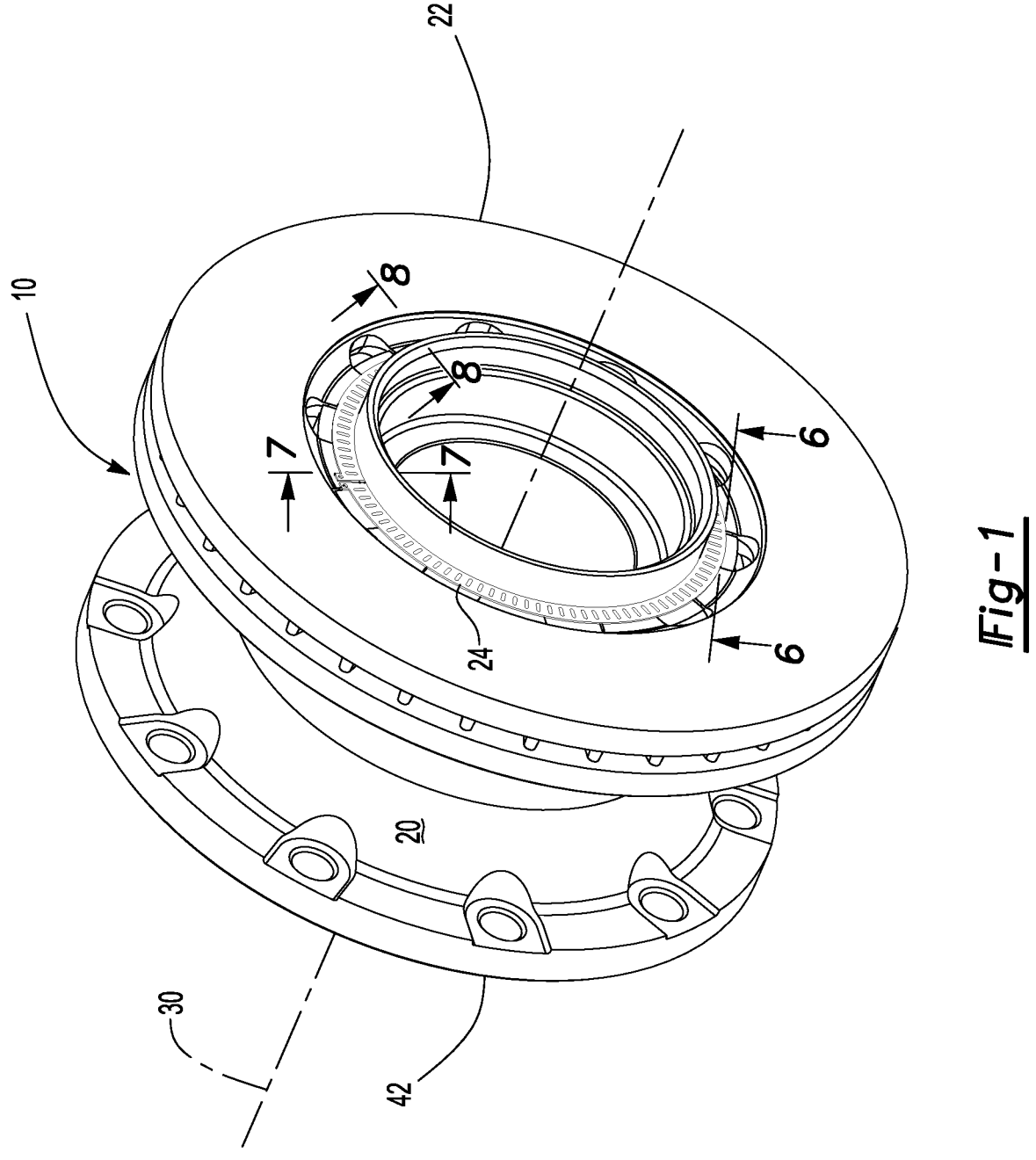
FIG. 1 is a perspective view of an example of an assembly comprising a wheel hub, a brake rotor, and a fastener.

Referring to FIG. 1, an example of an assembly 10 is shown. The assembly 10 comprises a wheel hub 20, a brake rotor 22, and a fastener 24. The assembly 10 may be provided with a vehicle like a truck, bus, farm equipment, military transport or weaponry vehicle, or cargo loading equipment for land, air, or marine vessels or a trailer that may be provided with a vehicle.

Figure 2:
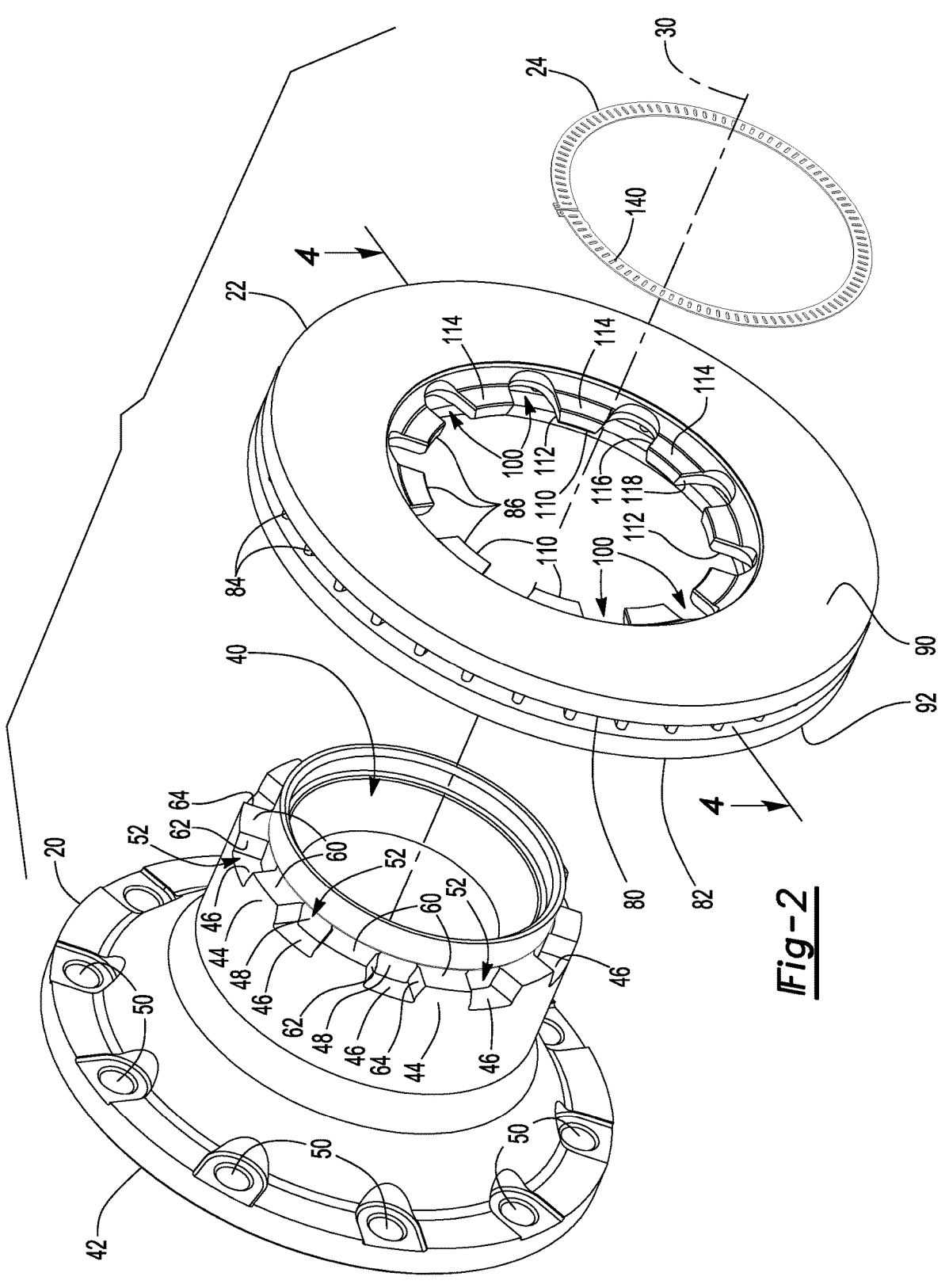
FIG. 2 is an exploded view of the assembly shown in FIG. 1.

Referring to FIGS. 1 and 2, the wheel hub 20 is configured to facilitate mounting and rotation of a wheel upon which a tire may be mounted. The wheel hub 20 is rotatable about an axis 30. In some configurations, the wheel hub 20 includes a hub cavity 40, a wheel mounting flange 42, a plurality of mounting bosses 44, one or more connecting surfaces 46, and one or more second connecting surfaces 48.

Referring to FIG. 2, the hub cavity 40 extends around axis 30. The hub cavity 40 is configured to receive various components that may facilitate rotation of the wheel hub 20. For instance, the hub cavity 40 may receive one or more wheel bearings that rotatably support the wheel hub 20 on a structural component, such as a spindle. The wheel bearings may encircle the spindle and permit the wheel hub 20 to rotate about the axis 30 with respect to the spindle.

The wheel mounting flange 42 extends away from the axis 30 and the hub cavity 40. A plurality of lug bolts may extend through holes 50 in the wheel mounting flange 42 to facilitate mounting of a wheel in a manner known by those skilled in the art.

Figures 4, 5:
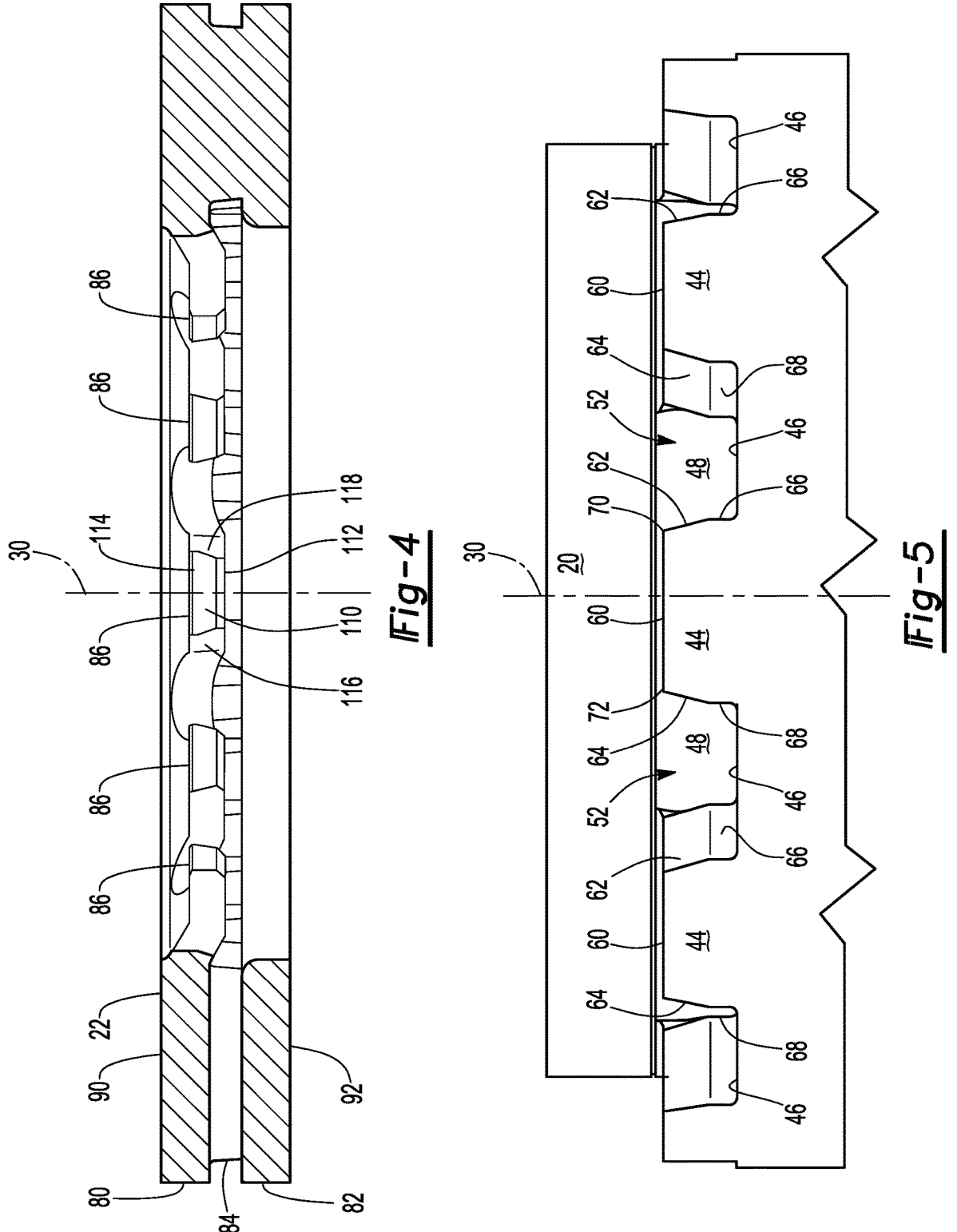
FIG. 4 is a section view of the brake rotor along section line 4-4.
FIG. 5 is a side view of a portion of the wheel hub.

Referring primarily to FIGS. 2 and 5, the mounting bosses 44 facilitate mounting of the brake rotor 22 to the wheel hub 20. For instance, a plurality of mounting bosses 44 may be provided that are arranged around the axis 30 and that extend away from the axis 30 and the hub cavity 40. The mounting bosses 44 are spaced apart from each other such that an opening 52 is provided between adjacent mounting bosses 44. The opening 52 may be open in an axial direction (e.g., a direction that extends along or parallel to the axis 30) that extends away from the wheel mounting flange 42. The opening 52 may be open in a radial direction (e.g., a direction that extends along a radial line that extends perpendicular to the axis 30) that faces away from the axis 30. In some configurations, the mounting boss 44 comprises an outboard side 60, a first flank 62, and a second flank 64. A mounting boss 44 may also comprise a first flank connecting surface 66 and a second flank connecting surface 68, which are best shown in FIG. 5. For clarity, only some mounting bosses 44 and associated features are labeled in FIGS. 2 and 5.

Referring to FIGS. 2 and 5, the outboard side 60 is disposed at an end of the mounting boss 44. For instance, the outboard side 60 may be disposed at an end of the mounting boss 44 that faces away from the wheel mounting flange 42. In some configurations, the outboard side 60 is disposed substantially perpendicular to the axis 30. The term "substantially perpendicular" is used herein to designate features or axes that are the same as or very close to perpendicular and includes features that are within ±3° of being perpendicular each other. In some configurations and as is best shown in FIG. 5, the outboard side 60 may have a generally trapezoidal configuration. The outboard side 60 may comprise a first end 70 and a second end 72. The first end 70 may be disposed opposite the second end 72.

The first flank 62 extends from the outboard side 60 to or toward a connecting surface 46. For example, the first flank 62 may extend from the first end 70 of the outboard side 60 toward the connecting surface 46. The first flank 62 may extend from a second connecting surface 48 in a direction that extends away from the axis 30. The first flank 62 of one mounting boss 44 faces toward the second flank 64 of an adjacent mounting boss 44. In some configurations, the first flank 62 is substantially planar. "Substantially planar" designates a feature that is planar or very close to planar such as being flat or generally flat, such as having a flatness or flatness tolerance between two parallel planes that define a zone where the entire feature or reference surface lies of ±0.5 mm. The first flank 62 may be disposed in a nonparallel relationship with the axis 30. The first flank 62 may also be disposed in a nonparallel relationship with the second flank 64.

The second flank 64 of the mounting boss 44 is disposed opposite the first flank 62. The second flank 64 extends from the outboard side 60 to or toward a different connecting surface 46 than the first flank 62. For example, the second flank 64 may extend from the second end 72 of the outboard side 60 toward another connecting surface 46. The second flank 64 may extend from a second connecting surface 48 in a direction that extends away from the axis 30. In some configurations, the second flank 64 is substantially planar.

The second flank 64 may be disposed in a nonparallel relationship with the axis 30. In addition, the second flank 64 may be disposed in a nonparallel relationship with the first flank 62.

As is best shown in FIG. 5, the first flank 62 and the second flank 64 of a mounting boss 44 may be axially tapered or tapered in a direction that extends along or parallel to the axis 30. For instance, the first flank 62 and the second flank 64 of a mounting boss 44 may be axially tapered such that the first flank 62 and the second flank 64 extend farther apart as the first flank 62 in the second flank 64 extend axially away from the outboard side 60 of the mounting boss 44 and toward respective connecting surfaces 46, 46.

Figure 3:
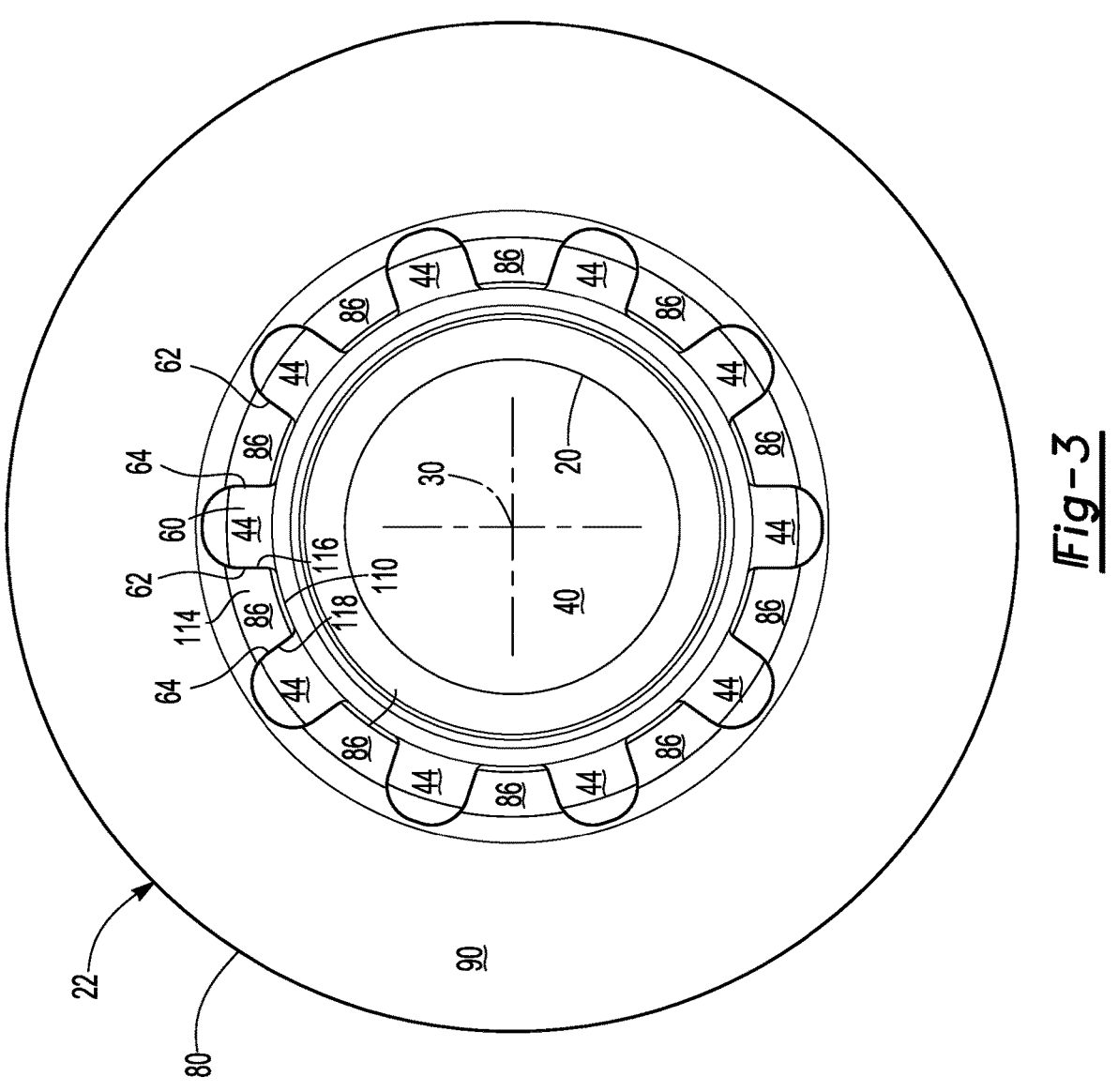
FIG. 3 is a side view of the assembly with the fastener omitted for clarity.

Referring primarily to FIG. 3, the first flank 62 and the second flank 64 of a mounting boss 44 may or may not be tapered when viewed from the axis 30. In some configurations, the first flank 62 and the second flank 64 of a mounting boss 44 may be disposed substantially parallel to each other as the first flank 62 and the second flank 64 extend away from the axis 30, in which case the opening 52 between adjacent mounting bosses 44, 44 becomes wider as the distance from the axis 30 increases due to the positioning of the mounting bosses 44 and different rotational positions about the axis 30. The term "substantially parallel" as used herein means the same as or very close to parallel and includes features or axes that are within ±3° of being parallel each other.

It is also contemplated that the first flank 62 and the second flank 64 of a mounting boss 44 may not disposed parallel to each other as the first flank 62 and the second flank 64 extend away from the axis 30. For instance, the first flank 62 and the second flank 64 may extend toward each other as the first flank 62 and the second flank 64 extend away from the axis 30, in which case the opening 52 between adjacent mounting bosses 44, 44 becomes wider as the distance from the axis 30 increases, or the first flank 62 and the second flank 64 may extend away from each other as the first flank 62 and the second flank 64 extend away from the axis 30.

Referring primarily to FIG. 5, the first flank connecting surface 66, if provided, extends from the first flank 62 to or toward the connecting surface 46. In some configurations, the first flank connecting surface 66 extends from an end of the first flank 62 that is disposed opposite the outboard side 60 to the connecting surface 46 or toward the connecting surface 46. The first flank connecting surface 66 or a portion thereof may be disposed substantially perpendicular to the connecting surface 46, the outboard side 60, or both.

The second flank connecting surface 68, if provided, may extend from the second flank 64 to or toward a different connecting surface 46 than that associated with the first flank connecting surface 66. For instance, the first flank connecting surface 66 may extend to or toward one connecting surface 46 while the second flank connecting surface 68 may extend to or toward another connecting surface 46. In some configurations, the second flank connecting surface 68 extends from an end of the second flank 64 that is disposed opposite the outboard side 60 to the connecting surface 46 or toward the connecting surface 46. The second flank connecting surface 68 or a portion thereof may be disposed substantially perpendicular to the connecting surface 46, the outboard side 60, or both. The first flank connecting surface 66 of a first mounting boss 44 may face toward the second flank connecting surface 68 of the second mounting boss 44 that is disposed adjacent to the first mounting boss 44.

Referring to FIGS. 2 and 5, a connecting surface 46 extends between adjacent mounting bosses 44, 44. For instance, the connecting surface 46 may extend from a first mounting boss 44 to a second mounting boss 44 and partially bounds the opening 52 therebetween. The connecting surface 46 is axially offset from the outboard side 60 of a mounting boss 44. In some configurations and as is best shown in FIG. 2, the connecting surface 46 is axially positioned or positioned along the axis 30 closer to the wheel mounting flange 42 than the outboard side 60 is positioned to the wheel mounting flange 42. The connecting surface 46 may be disposed substantially parallel to the outboard side 60. In some configurations, the connecting surface 46 is disposed substantially perpendicular to the axis 30. The connecting surface 46 may extend away from the axis 30 from a second connecting surface 48.

A second connecting surface 48 extends between adjacent mounting bosses 44, 44. For example, a second connecting surface 48 may extend from a first mounting boss 44 to a second mounting boss 44 and partially bound the opening 52 therebetween. For instance, the second connecting surface 48 may define a side of the opening 52 that is disposed closest to the axis 30. The second connecting surface 46 may face away from the axis 30. In some configurations, the second connecting surface 48 is an arcuate surface that is disposed at a substantially constant radial distance from the axis 30. The second connecting surface 48 may extend from an end of the connecting surface 46 in a axial direction that extends away from the wheel mounting flange 42.

Referring to FIGS. 1 and 2, the brake rotor 22 is rotatable about the axis 30 with the wheel hub 20. The brake rotor 22 is associated with a friction brake that is configured as a disc brake. The brake rotor 22 cooperates with the friction brake to facilitate braking of the wheel hub 20 and a corresponding wheel that is mounted to the wheel hub 20. For instance, the brake rotor 22 may have opposing friction surfaces that are configured to be engaged by corresponding brake pad assemblies to provide brake torque that slows or stops rotation of the brake rotor 22 about an axis of rotation, such as axis 30. The brake rotor 22 may encircle the axis 30 and the wheel hub 20. In some configurations and as is best shown with reference to FIGS. 3 and 4, the brake rotor 22 may include a first panel 80, a second panel 82, a set of vanes 84, and a plurality of mounting flanges 86.

Referring primarily to FIG. 4, the first panel 80 may be configured as a ring that may extend around the axis 30. The first panel 80 may have a first friction surface 90.

The first friction surface 90 may be engaged by friction material of a first brake pad to slow rotation of the brake rotor 22 and the wheel about the axis 30. The first friction surface 90 may be substantially planar. In addition, the first friction surface 90 may be disposed substantially perpendicular to the axis 30.

The second panel 82 may be spaced apart from the first panel 80. The first panel 80 and the second panel 82 may have substantially similar configurations. Accordingly, the second panel 82 may be configured as a ring that may extend around the axis 30 and may have a second friction surface 92.

The second friction surface 92 may be engaged by friction material of second brake pad to slow rotation of the brake rotor 22 and the wheel about the axis 30. The second friction surface 92 may face away from the first friction surface 90 and may be substantially planar. In addition, the second friction surface 92 may be disposed substantially perpendicular to the axis 30 and may be disposed substantially parallel to the first friction surface 90.

The set of vanes 84 extend from the first panel 80 to the second panel 82. The vanes 84 may be arranged around the axis 30 and may interconnect the first panel 80 with the second panel 82 while providing an air gap between the first panel 80 and the second panel 82 that may facilitate cooling of the brake rotor 22.

Referring primarily to FIGS. 2-4, the mounting flanges 86 facilitate mounting of the brake rotor 22 to the wheel hub 20. One or more mounting flanges 86 may be provided with the brake rotor 22. As is best shown in FIG. 2, a plurality of mounting flanges 86 are illustrated that are arranged around the axis 30 and that are spaced apart from each other such that a gap 100 is provided between adjacent mounting flanges 86, noting that all mounting flanges 86 and gaps 100 are not labeled in FIG. 2 for clarity. The mounting flanges 86 may extend radially inward toward the axis 30 with respect to the first panel 80, the second panel 82, or both. For instance, a mounting flange 86 may extend from the first panel 80, the second panel 82, or both toward the axis 30. In the configuration shown, the mounting flanges 86 are depicted as extending from the first panel 80 and are spaced apart from and do not extend from the second panel 82. In some configurations, a mounting flange 86 comprises an inner mounting flange side 110, a first mounting flange side 112, a second mounting flange side 114, a first mounting flange flank 116, a second mounting flange flank 118.

The inner mounting flange side 110 faces toward the axis 30. For instance, the inner mounting flange side 110 may be disposed at an end of the mounting flange 86 that faces toward the axis 30. In some configurations, the inner mounting flange side 110 extends along an arc and may be disposed at a substantially constant radial distance from the axis 30. The inner mounting flange side 110 extends between the first mounting flange side 112 and the second mounting flange side 114. In some configurations, the inner mounting flange side may extend from the first mounting flange side 112 to or toward the second mounting flange side 114 or from the second mounting flange side 114 to or toward the first mounting flange side 112. In some configurations, the inner mounting flange side 110 extends between first mounting flange flank 116 and the second mounting flange flank 118. For example, the inner mounting flange side 110 may extend from the first mounting flange flank 116 to the second mounting flange flank 118.

Figure 7:
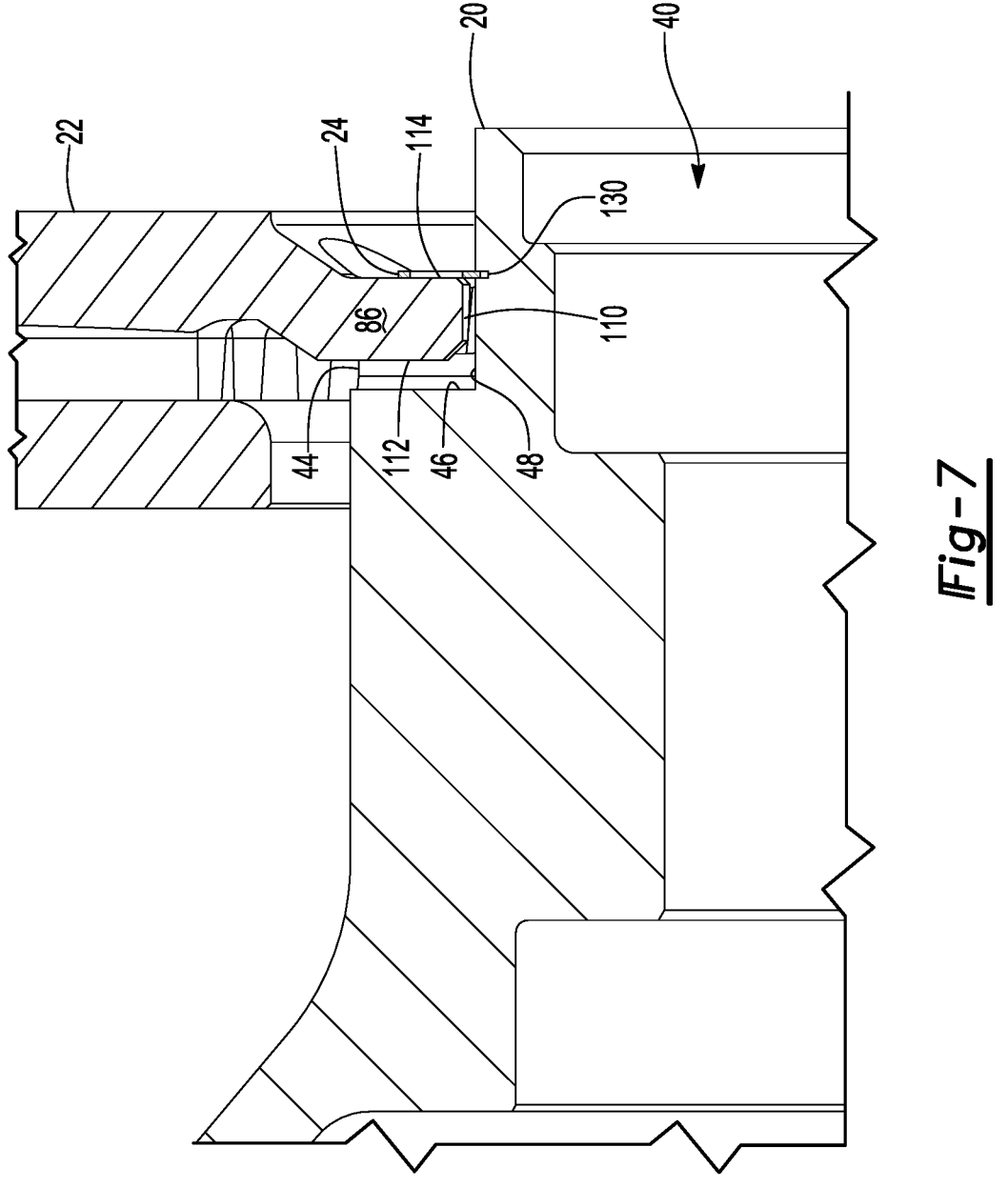
FIG. 7 is a section view of the assembly along section line 7-7.

Referring primarily to FIG. 7, the first mounting flange side 112 faces toward a connecting surface 46 of the wheel hub 20. As such, the first mounting flange side 112 may face away from the fastener 24. In some configurations, the first mounting flange side 112 may be spaced apart from and may not contact the connecting surface 46 toward which the first mounting flange side 112 faces, thereby providing clearance that may facilitate installation and/or facilitate cooling. The first mounting flange side 112 or a portion thereof may be disposed substantially perpendicular to the axis 30. The first mounting flange side 112 may be axially positioned at or near the center of the brake rotor 22, such as midway between the first panel 80 and the second panel 82.

Figure 6:
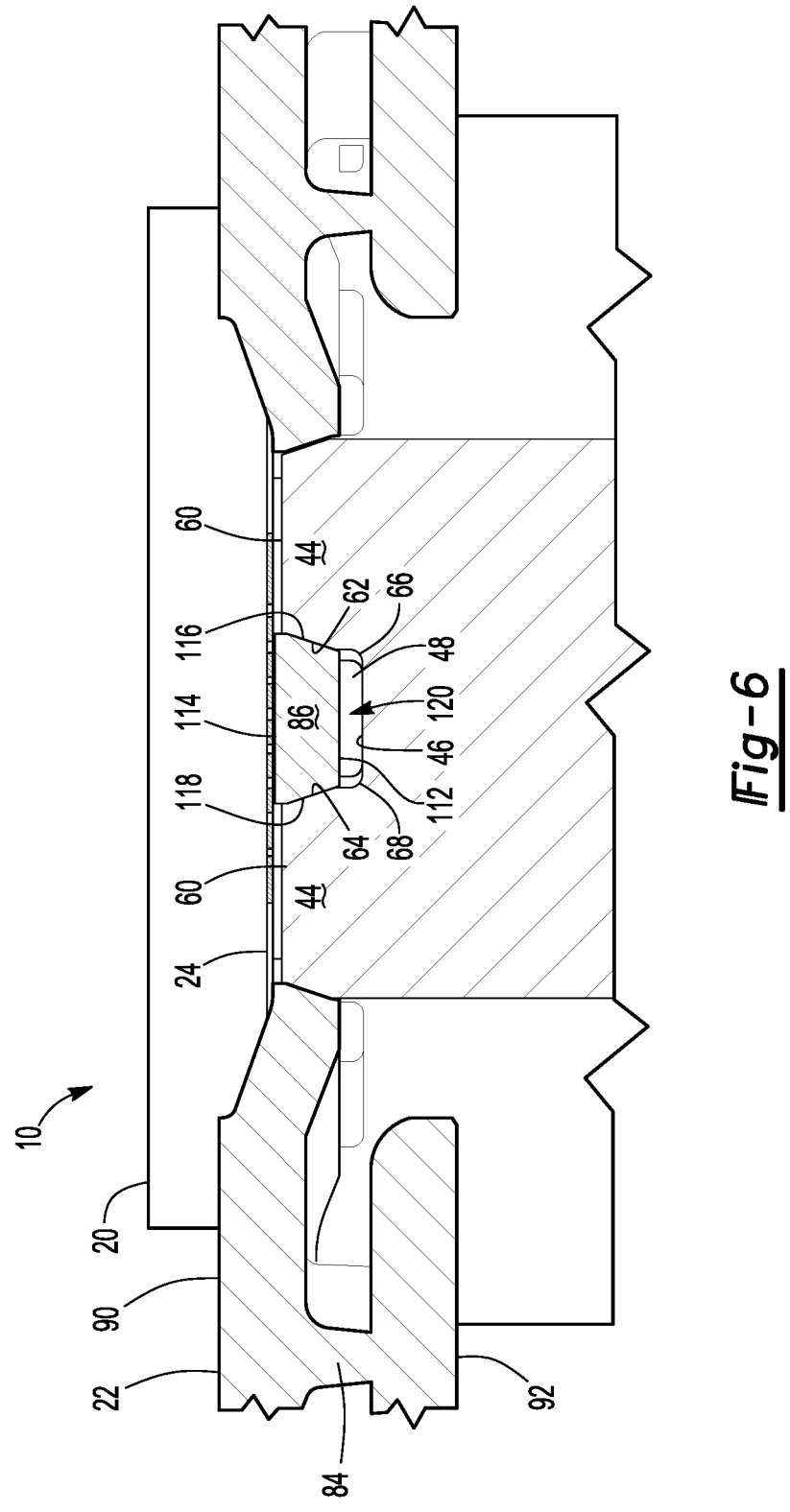
FIG. 6 is a section view of the assembly along section line 6-6.

The second mounting flange side 114 is disposed opposite the first mounting flange side 112. As such, the second mounting flange side 114 faces toward the fastener 24. The second mounting flange side 114 may contact or engage the fastener 24. The second mounting flange side 114 may be axially positioned farther from an associated connecting surface 46 than the first mounting flange side 112 is positioned from the connecting surface 46. In some configurations, the second mounting flange side 114 or a portion thereof may be disposed substantially perpendicular to the axis 30. As is best shown in FIG. 6, the second mounting flange side 114 may be offset from the outboard side 60 of one or more mounting bosses 44. For instance, the second mounting flange side 114 may be axially offset from the outboard side 60 or protrude with respect to the outboard side 60 such that the second mounting flange side 114 is disposed farther from the connecting surface 46 than the outboard side 60 of an adjacent mounting boss 44 is disposed from the connecting surface 46.

Referring primarily to FIGS. 2 and 4, the first mounting flange flank 116 extends between the first mounting flange side 112 and the second mounting flange side 114. For instance, the first mounting flange flank 116 may extend from the first mounting flange side 112 to or toward the second mounting flange side 114. In addition, the first mounting flange flank 116 may extend from the inner mounting flange side 110 in a direction that extends away from the axis 30. In some configurations, the first mounting flange flank 116 may be substantially planar. As is best shown in FIG. 3, the first mounting flange flank 116 faces toward and engages a mounting boss 44 of the wheel hub 20 when assembled. For instance, the first mounting flange flank 116 may face toward and may engage or contact a flank of the mounting boss 44, such as the first flank 62 of a first mounting boss 44.

Referring primarily to FIGS. 2 and 4, the second mounting flange flank 118 is disposed opposite the first mounting flange flank 116. The second mounting flange flank 118 extends between the first mounting flange side 112 and the second mounting flange side 114. For instance, the second mounting flange flank 118 may extend from the first mounting flange side 112 to or toward the second mounting flange side 114. In addition, the second mounting flange flank 118 may extend from the inner mounting flange side 110 in a direction that extends away from the axis 30. In some configurations, the second mounting flange flank 118 may be substantially planar. The second mounting flange flank 118 may be disposed in a nonparallel and non-perpendicular relationship with the first mounting flange flank 116. As is best shown in FIG. 3, the second mounting flange flank 118 faces toward and engages a different mounting boss 44 of the wheel hub 20 than the first mounting flange flank 116. For instance, the second mounting flange flank 118 may face toward and may engage or contact a flank of a different mounting boss 44. In some configurations, the second mounting flange flank 118 faces toward and engages or contacts the second flank 64 of a second mounting boss 44.

The first mounting flange flank 116 and the second mounting flange flank 118 are tapered. The tapering can be provided in multiple directions. For instance, the first mounting flange flank 116 and the second mounting flange flank 118 may be axially tapered and radially tapered.

Referring primarily to FIGS. 4 and 6, an example of axial tapering of mounting flange flanks is shown. The first mounting flange flank 116 and the second mounting flange flank 118 are axially tapered or tapered in a direction that extends along or parallel to the axis 30. In some configurations, the first mounting flange flank 116 and the second mounting flange flank 118 are axially tapered such that the first mounting flange flank 116 and the second mounting flange flank 118 extend farther apart in a direction that extends from the first mounting flange side 112 toward the second mounting flange side 114. The first mounting flange flank 116 and the second mounting flange flank 118 may be axially tapered such that the first mounting flange flank 116 and the second mounting flange flank 118 become progressively further apart as the distance from the first mounting flange side 112 increases. In some configurations, the first mounting flange flank 116 and the second mounting flange flank 118 are tapered in the same manner or at the same angle but in opposite directions. Providing one or more axially tapered mounting flange flanks sets the axial positioning of the brake rotor 22 with respect to the wheel hub 20, limits axial movement of the brake rotor 22 along the wheel hub 20 toward the wheel mounting flange 42, helps resist rotation of the brake rotor 22 with respect to the wheel hub 20, or combinations thereof.

Referring primarily to FIG. 3, an example of a radial tapering of mounting flange flanks is best shown. The first mounting flange flank 116 and the second mounting flange flank 118 are tapered with respect to each other in a direction that extends away from the axis 30 or tapered with respect to a radial line that extends from the axis 30 such that the first mounting flange flank 116 and the second mounting flange flank 118 extend farther apart in a direction that extends from the inner mounting flange side 110 away from the axis 30. As such, the first mounting flange flank 116 may be radially tapered such that the first mounting flange flank 116 and the second mounting flange flank 118 become progressively further apart as the distance from the axis 30 increases.

Referring to FIG. 6, the wheel hub 20 and the brake rotor 22 may cooperate to form or define a gap 120. The gap 120 may extend axially from a connecting surface 46 of the wheel hub 20 to the first mounting flange side 112 of the mounting flange 86 of the brake rotor 22. The gap 120 may also extend from the first flank connecting surface 66 of a first mounting boss 44 to the second flank connecting surface 68 of a second mounting boss 44. The brake rotor 22 may be spaced apart from the flank connecting surfaces. For instance, the mounting flange 86 of the brake rotor 22 may be spaced apart from the first flank connecting surface 66 of the first mounting boss 44 and the second flank connecting surface 68 of the second mounting boss 44.

Referring primarily to FIGS. 1 and 6, the fastener 24 secures the brake rotor 22 to the wheel hub 20. For instance, the fastener 24 may inhibit axial movement of the brake rotor 22 away from the connecting surface 46 and thus inhibit removal of the brake rotor 22 from the wheel hub 20. The fastener 24 is secured to the wheel hub 20. For instance, the fastener 24 may be secured to the wheel hub 20 such that the wheel hub 20, the brake rotor 22, and the fastener 24 are rotatable together about the axis 30. The fastener 24 may have any suitable configuration. In some configurations, the fastener 24 may be configured as a clip, washer, snap ring, or the like.

In some configurations and as is best shown in FIG. 7, the fastener 24 may be received in a groove 130 in the wheel hub 20 that extends toward the axis 30. For instance, the groove 130 may extend from the second connecting surface 48 toward the axis 30. The groove 130 may extend around or encircle the axis 30.

Figure 8:
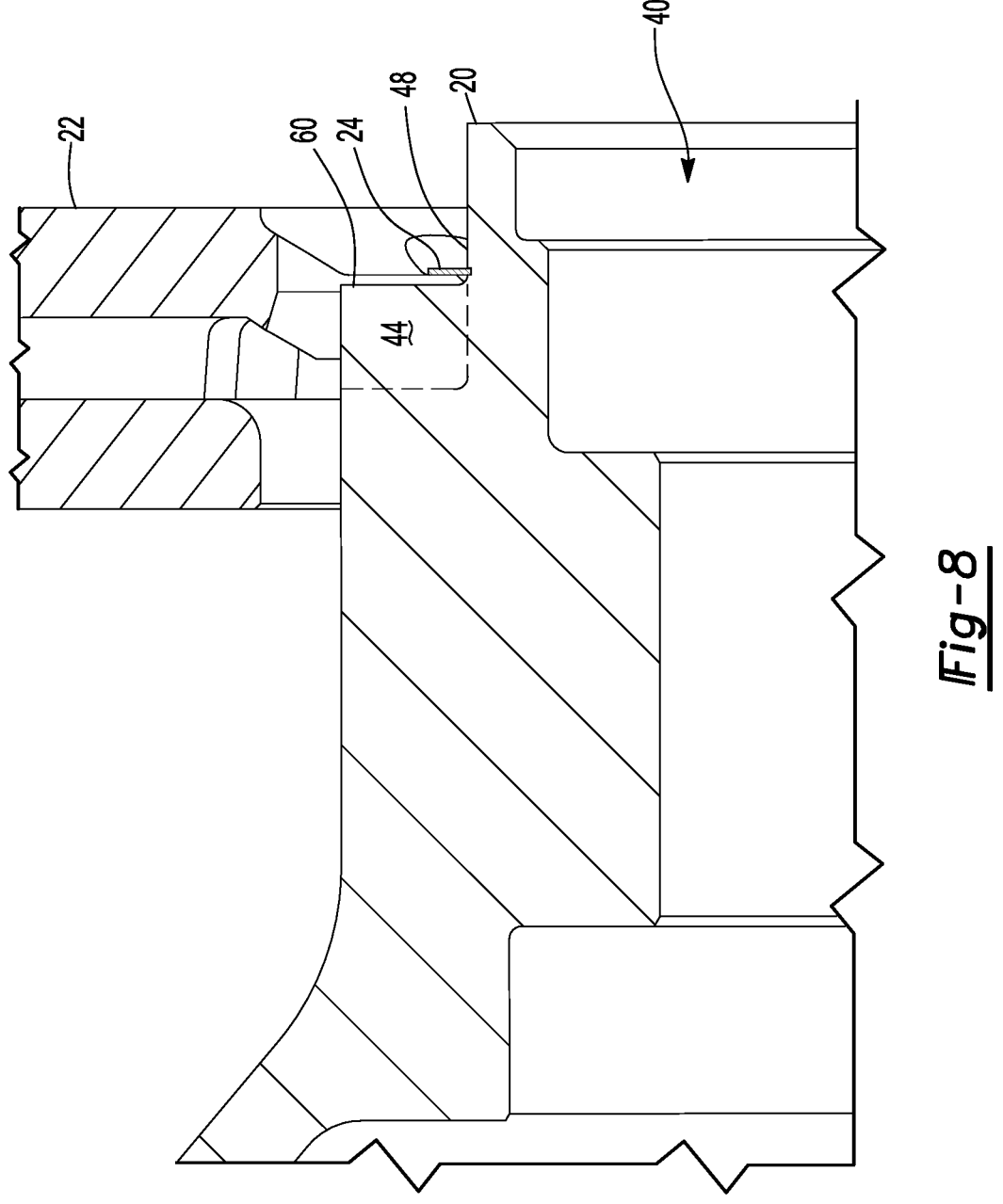
FIG. 8 is a section view of the assembly along section line 8-8.

The fastener 24 may engage or contact the second mounting flange side 114 of the mounting flange 86 of the brake rotor 22. For example, the fastener 24 may extend away from the axis 30 and out of the groove 130 to contact or engage the second mounting flange side 114. As is best shown in FIG. 8, the fastener 24 may be spaced apart from the mounting bosses 44 of the wheel hub 20. For instance, the fastener 24 may be spaced apart from the outboard side 60 of one or more mounting bosses 44.

Figure 9:
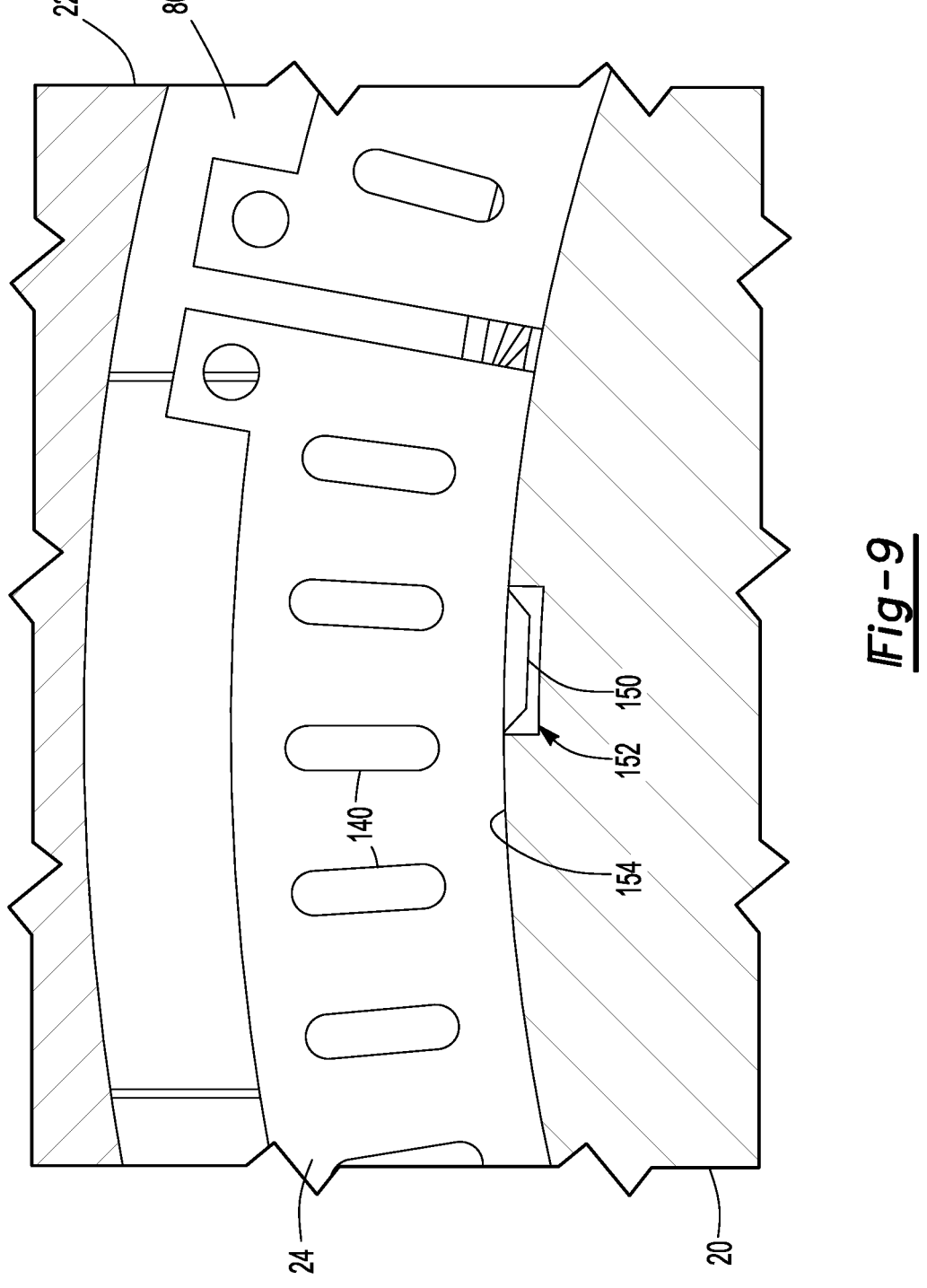
FIG. 9 is a magnified section view of the assembly taken perpendicular to an axis of rotation and through the fastener.

In some configurations and as is best shown in FIGS. 2 and 9, the fastener 24 may include a plurality of detectable features 140. The detectable features 140 may be arranged around the axis 30 in a repeating pattern or equally spaced angular intervals. A detectable feature 140 may be configured as a tooth that protrudes from the fastener 24 or a recess or indentation that extends into or through the fastener 24. Providing the fastener 24 with detectable features 140 may allow the fastener 24 to be configured as a tone ring that may be detectable by a sensor to provide a signal indicative of the rotational speed or velocity of the wheel hub 20 and hence the rotational velocity of a corresponding vehicle wheel.

In some configurations, the fastener 24 is secured to the wheel hub 20 such that the fastener 24 is inhibiting from rotating about the axis 30 with respect to the wheel hub 20. The fastener 24 may be non-rotatably secured in any suitable manner. For instance, the fastener 24 may be received in the groove 130 with an interference fit, secured with a fastener that is a separate component, or the like. In some configurations and as is best shown in FIG. 9, the fastener 24 includes an anti-rotation feature 150. The anti-rotation feature 150 may limit or inhibit rotation of the fastener 24 about the axis 30 with respect to the wheel hub 20. The anti-rotation feature 150 may extend toward the axis 30, such as from a side of the fastener 24 that faces toward the axis 30, and into a recess 152 that extends toward the axis 30 from a bottom wall or bottom side 154 of the groove 130. It is also contemplated that the fastener 24 may be secured to the brake rotor 22 to inhibit rotation of the fastener 24 about the axis 30 in addition to being secured to the wheel hub 20 or as an alternative to being secured to the wheel hub 20.

The present invention allows a brake rotor to be mounted to a wheel hub without threaded fastener such as bolts. A bolted connection between a brake rotor and a wheel hub may be less durable than a non-bolted connection. For instance, the temperature of the brake rotor increases during brake application. Increased temperature causes thermal expansion of the brake rotor and conduction of thermal energy to holes or openings in the brake rotor that receive a threaded fastener. Thermal expansion of a bolted connection increases localized stresses and can result in cracking of the brake rotor, such as the formation of cracks that are disposed proximate or extend from the hole or opening that receives the fastener, which in turn can reduce brake rotor service life. The present invention may eliminate the use of individual mounting clips that are used to secure the brake rotor to individual mounting bosses of the wheel hub, thereby reducing assembly time and complexity. In addition, the present invention may eliminate the use of threaded fasteners that are used to attach each mounting clip to a different mounting boss, thereby also reduce assembly time and complexity. The present invention may also help reliably and stably position a brake rotor directly upon a wheel hub without intervening components and may secure the brake rotor to the wheel hub with a single fastener, which may help reduce assembly time.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:

a wheel hub that is rotatable about an axis, the wheel hub comprising a first mounting boss and a second mounting boss that is spaced apart from the first mounting boss; and a brake rotor that is disposed on the wheel hub, the brake rotor comprising a mounting flange that comprises:

a first mounting flange side;

a second mounting flange side that is disposed opposite the first mounting flange side;

a first mounting flange flank that extends between the first mounting flange side and the second mounting flange side and that engages the first mounting boss;

a second mounting flange flank that extends between the first mounting flange side and the second mounting flange side and that engages the second mounting boss; and an inner mounting flange side that faces toward the axis and extends between the first mounting flange flank and the second mounting flange flank;

wherein the first mounting flange flank and the second mounting flange flank are axially tapered such that the first mounting flange flank and the second mounting flange flank extend farther apart in a direction that extends from the first mounting flange side to the second mounting flange side and are radially tapered such that the first mounting flange flank and the second mounting flange flank extend farther apart in a direction that extends from the inner mounting flange side away from the axis.

2. The assembly of claim 1 wherein the wheel hub further comprises a connecting surface that extends away from the axis and extends from the first mounting boss to the second mounting boss, wherein the first mounting flange side faces toward the connecting surface.

3. The assembly of claim 2 wherein the first mounting flange side is spaced apart from and does not contact the connecting surface.

4. The assembly of claim 2 further comprising a fastener that is secured to the wheel hub and that engages the second mounting flange side to inhibit axial movement of the brake rotor away from the connecting surface.

5. The assembly of claim 4 wherein the fastener is spaced apart from the first and second mounting bosses.

6. The assembly of claim 4 wherein the fastener includes a plurality of openings that are arranged around the axis.

7. The assembly of claim 4 wherein the fastener is received in a groove in the wheel hub.

8. The assembly of claim 7 wherein the fastener includes an anti-rotation feature that extends toward the axis and into a recess that extends toward the axis from a bottom wall of the groove.

9. The assembly of claim 1 wherein the first flange mounting flank and the second flange mounting flank are substantially planar.

10. The assembly of claim 1 wherein the wheel hub further comprises a connecting surface that extends away from the axis and extends from the first mounting boss to the second mounting boss, and first and second mounting bosses each further comprise:

an outboard side;

a first flank that extends from a first end of the outboard side toward the connecting surface; and a second flank that is disposed opposite the first flank and that extends from a second end of the outboard side toward the connecting surface;

wherein the first flank and the second flank are axially tapered such that the first flank and the second flank extend farther apart as the first flank and the second flank extend away from the outboard side.

11. The assembly of claim 10 wherein the first flank of the first mounting boss and the second flank of the second mounting boss extend farther apart as the first flank and the second flank extend away from the axis.

12. The assembly of claim 10 wherein the first flank and the second flank are substantially planar.

13. The assembly of claim 10 wherein the first mounting boss further comprises a first flank connecting surface that extends from an end of the first flank that is disposed opposite the outboard side toward the connecting surface.

14. The assembly of claim 13 wherein the first flank connecting surface is disposed substantially perpendicular to the outboard side of the first mounting boss.

15. The assembly of claim 13 wherein the second mounting boss further comprises a second flank connecting surface extends from an end of the second flank that is disposed opposite the outboard side toward the connecting surface, wherein the second flank connecting surface of the second mounting boss faces toward the first flank connecting surface of the first mounting boss.

16. The assembly of claim 15 wherein the brake rotor and the wheel hub cooperate to define a gap that extends from the connecting surface of the wheel hub to the first mounting flange side of the mounting flange of the brake rotor and extends from the first flank connecting surface of the first mounting boss to the second flank connecting surface of the second mounting boss.

17. The assembly of claim 15 wherein the brake rotor is spaced apart from the first flank connecting surface of the first mounting boss and the second flank connecting surface of the second mounting boss.

18. The assembly of claim 10 wherein the second mounting flange side of the mounting flange of the brake rotor is axially offset from the outboard side of the first mounting boss.

19. The assembly of claim 18 wherein the second mounting flange side is disposed farther from the connecting surface than the outboard side of the first mounting boss is disposed from the connecting surface.

20. The assembly of claim 18 wherein a fastener engages the second mounting flange side and is spaced apart from the outboard side of the first mounting boss.

* * * * *